United States Patent Office 3,361,557
Patented Jan. 2, 1968

3,361,557
PROCESSES FOR DIRECT REDUCTION OF IRON-BEARING ORES, SLAGS AND THE LIKE
Donald E. Babcock, Bay Village, Ohio, Eugene C. Iudice, Brooklyn, N.Y., and George G. Reed, Jr., Mountain Lakes, N.J., assignors, by direct and mesne assignments, to R-N Corporation, New York, N.Y., a corporation of Delaware
No Drawing. Filed Mar. 22, 1965, Ser. No. 441,839
16 Claims. (Cl. 75—1)

This invention pertains to the reduction of iron ores and other iron-bearing materials, the iron values of which are present in forms difficult to reduce, such for example as iron silicates, or in forms highly contaminated by the presence of other elements which are difficult to eliminate during reduction, such as high sulfur or high contents of other metals such as titanium, manganese, copper, arsenic, etc.

The invention provides simple and inexpensive methods for so processing all such materials as to convert the same where required to a form suitable for direct reduction without melting or fusion, and for so processing and reducing such materials as to eliminate or segregate all such contaminants, such that upon concentrating the products of reduction by grinding and magnetic separation, a high purity metallic iron concentrate is obtained, with iron recoveries on the order of 90–98%, and usually in excess of 95%.

The iron silicate ores in particular, have heretofore proved so difficult to reduce efficiently, that no commercially feasible method has heretofore been evolved for recovering the metallic iron values therefrom. The iron silicate ores, such as those containing the iron silicates fayalite and/or chamosite, as for example Chichali Pakistan ore and the "iron stones" found in large quantities in England, may be reduced by smelting in the blast furnace, but such reduction produces three to four tons of slag per ton of pig iron, so that the winning of metallic iron from these ores is not commercially competitive with that derived from other sources, such as the oxidic iron ores. So far as we are aware no direct reduction process has heretofore been devised for effectively reducing iron silicate ores without fusion or melting. Such ores may, however, be efficiently metallized by direct reduction without fusion when processed in accordance with the present invention.

The same is true with respect to the iron-containing copper slags obtained in vast quantities in the refining of copper, no use for which has been found to date in that no one insofar as we are aware has evolved a way of recovering the iron and copper values, at least on a commercially economical basis. These slags which contain about 35–55% iron oxide as FeO are, however, reducible by direct reduction according to our invention to provide a metallized reduced ore product from which the metallic iron and copper values may be separated and recovered by grinding and magnetic separation.

Likewise, in accordance with the techniques of this invention, iron ores, slags and concentrates which contain other metallics, such as the arsenates, titanates, manganates, etc., may be directly reduced with respect to the iron values and the metallics recovered by subjecting the reduced ore product to grinding and magnetic separation.

Considering first the application of our invention to reduction of iron silicate ores, the problem encountered in attempting to reduce them is that they form glass-like slags of $FeSiO_3$ and/or $Fe_2SiO_4$ which cannot be directly reduced with reducing gases such as CO or $H_2$ and which cannot be reduced without melting with solid carbonaceous reductants, such as coke, coke breeze or the like.

Now we have discovered in accordance with a basic concept of our invention that if iron silicate ores or glass-like slags containing $FeSiO_3$ and/or $Fe_2SiO_4$ are roasted at temperatures just below incipient fusion or slagging, i.e., at for example about 1600–1850° F. and preferably at about 1800° F., and in an appropriately selected or controlled atmosphere during the roasting as described below and such as to convert the iron silicates present into silica $SiO_2$ plus the magnetic iron oxide $Fe_3O_4$ as an intermediate or final phase of the processing, that the silica so formed segregates or separates from the magnetic iron oxide in such manner that on subsequent direct reduction followed by concentration by grinding and magnetic separation, the silicates are easily separated from the metallic iron values. That is to say, the magnetic oxide $Fe_3O_4$ does not form a glass-like slag with silica and in this respect is unique as compared to the lower and higher order iron oxides such as FeO and $Fe_2O_3$ which do form glass-like slags with silica on heating, i.e., $FeSiO_3$ and $Fe_2O_3 \cdot 2SiO_2$.

We have found that the atmosphere to be employed during the roasting or at successive stages thereof depends on the type of iron silicates present in the starting material, whether ferrous or ferric or both. If the iron is present only in the ferrous form, the roasting must be conducted in an oxidizing atmosphere for the requisite time, usually a matter of two or three hours, to oxidize the iron up to the level of the magnetic oxide $Fe_3O_4$, but not such as to oxidize the iron to a higher level such as that of hematite $Fe_2O_3$. When the oxidation is thus properly carried out, as exemplified below, the following reaction occurs:

(1) 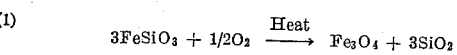
$$3FeSiO_3 + 1/2O_2 \xrightarrow{Heat} Fe_3O_4 + 3SiO_2$$

If the atmosphere is too oxidizing or the roasting period is too long, the following undesired reactions occur:

(2) 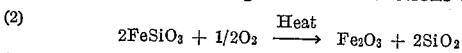
$$2FeSiO_3 + 1/2O_2 \xrightarrow{Heat} Fe_2O_3 + 2SiO_2$$

(3) 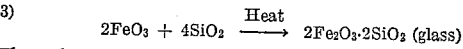
$$2FeO_3 + 4SiO_2 \xrightarrow{Heat} 2Fe_2O_3 \cdot 2SiO_2 \text{ (glass)}$$

Thus the end product of reactions (2) and (3) is a glass-like slag which is not reduced to metallic iron on subsequent direct reduction. On the other hand, if the atmosphere is not sufficiently oxidizing or is in fact reducing, no change occurs on heating.

If the iron is initially present only in the ferric form as for example as $Fe_2O_3 \cdot 2SiO_2$, the roasting atmosphere must be reducing but not exclusively so, in order to produce the desired reaction as follows:

(4) 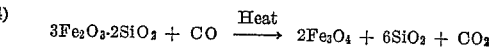
$$3Fe_2O_3 \cdot 2SiO_2 + CO \xrightarrow{Heat} 2Fe_3O_4 + 6SiO_2 + CO_2$$

If the atmosphere is not sufficiently reducing, i.e., is too oxidizing, no reaction occurs, and if too reducing another glass-like slag is formed, thus (5) 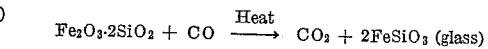
$$Fe_2O_3 \cdot 2SiO_2 + CO \xrightarrow{Heat} CO_2 + 2FeSiO_3 \text{ (glass)}$$

This glass-like reaction product is not susceptible to direct reduction.

Generally the iron silicate ores contain both ferrous and ferric silicates, and hence must be initially roasted in an oxidizing atmosphere to oxidize the ferrous silicate content up to the level of $Fe_3O_4$ and must then be further roasted in a reducing atmosphere to reduce the ferric silicate content down to the oxygen level of $Fe_3O_4$. The initial roasting may be conducted in air for about two to three hours at about 1800° F. Thereupon carbon is added with continued roasting, and in approximately the stoichiometric amount required to react according to the following Equation 6 with all $Fe_2O_3$ present in the ore as such and as ferric silicates.

(6) 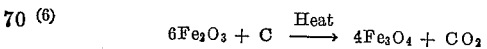
$$6Fe_2O_3 + C \xrightarrow{Heat} 4Fe_3O_4 + CO_2$$

For shallow ore beds of up to about one foot in depth, the carbon addition is not critical within limits of about 2–3% by weight of the ore. For deeper beds of about one foot or more, the carbon addition must be more carefully controlled in accordance with the above Equation 6, especially where the atmosphere above the bed contains free oxygen. The carbon addition generally falls within the broad range of about 0.1–4%. As the result of these successive treatments, the glass-like initial slag consisting essentially of the ferrous and ferric silicates is converted into a reaction product consisting essentially of silica and the magnetic iron oxide. Since as above explained the magnetic oxide does not form a glass-like slag with the silica, this reaction product is amenable to direct reduction without fusion, and the reduction product amenable to recovery of the metallic iron values by grinding and magnetic separation.

The product of this roasting treatment may be reduced to metallic iron by means of either gaseous reducing agents, as by heating in an atmosphere of reducing gases such as CO and/or $H_2$, or by means of solid carbonaceous reducing agents, as by heating in admixture with coke or the like. Our preferred method of reduction is that described in U.S. Patent 2,829,042 to O. Moklebust. According to this process the end product of the roasting treatment is fed in admixture with an excess of a solid carbonaceous reducing agent, such as coke, through a rotary kiln traversed by a counterflow of hot combustible gases which are controllably burned by introducing oxygen or a free oxygen-containing gas at spaced points along the kiln, to provide the requisite heat and temperature profile along the length of the kiln for reducing the ore most efficiently. The kiln temperature is thus maintained just below the fusion or sintering temperature, usually at about 2000–1950° F., throughout the reduction zone of the kiln, which extends from the delivery end a sufficient distance toward the feed end for maximum metallization.

Since the small amount of carbon added during the roasting treatment is mostly consumed during that stage, additional carbon must be added for the reduction stage and in excess of the theoretical amount required for reducing the ore, i.e., preferably from a minimum of about 10% in excess of the theoretical amount up to several times that amount or more, since the efficiency of reduction progressively increases at a substantial rate with the amount of excess carbon within this range.

The invention is also applicable to the reduction of titaniferous ores, where (as in the case of the magnetite recrystallization above described with reference to the roasting of the iron silicate ores) recrystallization, grain growth and decreased interlocking of the mineral phases occur upon roasting, whereby the iron oxide values segregate from the titanium values, thereby facilitating separation by grinding and magnetic separation following direct reduction of the ore.

The invention is also particularly applicable to the reduction of fully oxidized arsenic mineral-bearing iron ores wherein the arsenic is converted by the roasting treatment from a form, such as the arsenate $As_2O_5$, which does not boil off during reduction as do the lower oxidized arsenic compounds.

The invention also finds particular application in the processing of high sulfur-containing ores for reducing the content thereof within commercially acceptable tolerances in the final metallic iron concentrate.

Having thus described the essential features of the invention, the following examples are illustrative of the results attainable thereby.

*Example I*

In order to compare the effect of the pre-roasting treatment above described in facilitating the reduction of a high silica ore, charges of an ore sample known as "Tilden T 185" were subjected to direct reduction in accordance with the process described in the above Moklebust patent, the first charge "A" having been given no preroasting treatment, and the second charge "B" given the preroasting treatment described below. The ore in question was of the following assay:

Fe:$SiO_2$ ratio ------------------------------------- 0.669
Total Fe ------------------------------------------- 33.5
FeO ----------------------------------------------- 5.43
$SiO_2$ ----------------------------------------------- 50.1
$Al_2O_3$ --------------------------------------------- 1.13
Balance—residual amounts of other elements not exceeding 10% in total amount.

Charge "B" was subjected to a preroasting treatment consisting in heating to 1800° F. in an atmosphere containing free oxygen but no combustibles for a period of two hours, of which an initial period of one-half hour was required to heat up the charge from room temperature to 1800° F. At the end of the above period, the atmosphere was shifted to one containing sufficient free carbon monoxide to be reducing to hematite but not reducing to magnetite by adding 3% of coke breeze by weight of the charge to the shallow bed of materials and the heating continued at 1800° F. for an additional two hours, after which coke breeze in excess of the theoretical amount required for reducing the ore was added and the charge directly reduced in accordance with the Moklebust patent. Charge "A" was given no preroast, but was directly reduced upon addition of carbon in excess of the theoretical amount.

The reduced ore product from charge "A" was then concentrated by subjecting to three stages of grinding and magnetic separation, and the same processing was applied to the reduced ore product of charge "B," the third stage concentrates obtained being as shown below:

| Third Stage Concentrate | Charge A No Preroast, Percent | Charge B With Preroast, Percent |
| --- | --- | --- |
| Total Iron | 87.1 | 97.5 |
| Metallization | 95.3 | 98.3 |
| Calculated Gangue | 11.7 | 2.0 |
| Weight Recovery | 39.6 | 44.7 |
| Iron Recovery | 87.3 | 94.1 |

It will be seen from the above data that the iron recovery without the preroast was only 87.3% as compared to 94.1% with the preroast, giving an increase in recovery of approximately 7% as a result of the preroasting treatment. It is also to be noted that with the preroasted charge "B" the metallization was 98.3% and the total iron 97.5%, as against the much lower values of 95.3% and 87.1%, respectively, for charge "A" having no preroast. Emphasis is also laid on the much lower residual gangue content in the concentrate from the preroasted charge "B" amounting to only 2% as against 11.7% for the non-preroasted charge "A."

*Example II*

Charges "A" and "B" of a heavy-media Yugoslav Middlings were subjected to the same processing, respectively, as in Example I. The ore assayed as follows:

Fe:$SiO_2$ ratio ------------------------------------- 1.65
Total Fe ------------------------------------------- 32.3
FeO ----------------------------------------------- 21.7
$SiO_2$ ----------------------------------------------- 19.5
$Al_2O_3$ --------------------------------------------- 2.7
CaO ----------------------------------------------- 0.86
MgO ----------------------------------------------- 0.60
MnO ----------------------------------------------- 5.24

As in Example I, the non-preroast charge "A" and the preroast charge "B" were subjected in each instance to three stages and grinding and magnetic separation, the assay of the third stage concentrates being as shown below:

| Third Stage Concentrate 3.0 Hours Total Grinding | Charge A No Preroast, Percent | Charge B With Preroast, Percent |
|---|---|---|
| Total Iron | 92.4 | 97.7 |
| Metallization | 94.6 | 98.4 |
| Calculated Gangue | 6.2 | 1.8 |
| Weight Recovery | 41.9 | 58.3 |
| Iron Recovery | 73.8 | 91.7 |

Here again it will be seen that the preroast greatly increased the iron recovery, the recovery without the preroast being only 73.8% as compared to 91.7% with the preroast, an increase of approximately 18% as a result of the preroasting treatment. Also the metallization, total iron and weight recovery was much higher and the gangue content much lower for the preroast charge "B" as compared to the non-preroast charge "A."

*Example III*

Charges "A" and "B" of a Chichali Pakistan ore were subjected to the same processing, respectively, as in Example I. This ore assayed as follows:

$Fe:SiO_2$ ratio _____ 1.54
Total Fe _____ 33.14
FeO _____ 10.99
$SiO_2$ _____ 21.47
$Al_2O_3$ _____ 6.39
CaO _____ 1.02
MgO _____ 2.79
$CO_2$ _____ 9.94

Following reduction each charge was subjected to three stages of concentration by grinding and magnetic separation with results as shown below:

| Third Stage Concentrate 3.0 Hours Total Grinding | Charge A No Preroast, percent | Charge B With Preroast, percent |
|---|---|---|
| Total Iron | 92.6 | 98.2 |
| Metallization | 98.1 | 99.5 |
| Calculated Gangue | 6.9 | 1.6 |
| Weight Recovery | 37.4 | 52.2 |
| Iron Recovery | 81.8 | 95.7 |

Here again the substantial increase in iron recovery resulting from the preroast is apparent, that without the preroast being 81.8% compared to 95.7% with the preroast, an increase in recovery of approximately 14%. Also in all other respects the concentrate of the preroast charge "B" was far superior to that of the non-preroast charge "A."

*Example IV*

A Clarksdale copper slag assaying as follows as to its principal constituents, was processed as described below:

$Fe:SiO_2$ ratio _____ 1.04
Total Fe _____ 34.5
FeO _____ 27.7
$SiO_2$ _____ 33.2
$Al_2O_3$ _____ 5.62
CaO _____ 1.83
MnO _____ 2.50

In this example, charge "A" was roasted in air for four hours at 1800° F. without adding carbon at any stage of the roasting operation; while a second charge "B" was roasted in air for two hours at 1800° F., following which 3% by weight of the coke breeze was added to the shallow bed of materials and the roasting continued for another two hours. Following reduction and concentration the third stage concentrates assayed as follows:

| Third Stage Concentrate 3.0 Hours Total Grinding | Charge A, Percent | Charge B, Percent |
|---|---|---|
| Total Iron | 98.8 | 96.1 |
| Metallization | 97.3 | 99.0 |
| Calculated Gangue | 0.4 | 3.6 |
| Weight Recovery | 33.3 | 31.0 |
| Iron Recovery | 78.3 | 85.6 |

It will be seen from this data that the preroast of charge "A" without coke addition is much less effective than that of charge "B" with the coke addition as regards the iron recoveries, which were 78.3% and 85.6%, respectively. Thus the coke addition toward the end of the roasting operation increased the iron recovery by approximately 8%.

*Example V*

Charges "A" and "B" of a MacIntyre magnetite ore were subjected to the name processing, respectively, as in Example I. This ore assayed as follows with respect to its principal constituents:

$Fe:SiO_2$ ratio _____ 17.2
Total Fe _____ 56.9
FeO _____ 30.7
$SiO_2$ _____ 3.30
$Al_2O_3$ _____ 4.68
CaO _____ 0.25
MgO _____ 1.57
$TiO_2$ _____ 9.25
$Fe:TiO_2$ ratio _____ 6.15

Following reduction each charge was subjected to two stages of concentration by grinding and magnetic separation, with results as shown below:

| Second Stage Concentration 2.0 Hours Total Grinding | Charge A No Preroast, Percent | Charge B With Preroast, Percent |
|---|---|---|
| Total Iron | 86.0 | 98.1 |
| Metallization | 96.7 | 98.5 |
| Calculated Gangue | 13.2 | 1.5 |
| $TiO_2$ | 7.0 | 1.12 |
| Weight Recovery | 77.3 | 75.3 |
| Iron Recovery | 97.4 | 93.3 |

The improvement resulting from the preroast will be at once apparent in the high total iron and metallization values as compared to the no preroast figures, and also with respect to the calculated gangue and $TiO_2$ values which are much lower with than without the preroast.

*Example VI*

Charges "A" and "B" of a Peace River (Clear Hills) ore were subjected to the same processing, respectively, as in Example I. This ore assayed as follows as to its principal constituents:

$Fe:SiO_2$ ratio _____ 1.75
Total Fe _____ 35.5
$SiO_2$ _____ 20.4
$Al_2O_3$ _____ 4.71
CaO _____ 3.15
MgO _____ 1.04
MnO _____ 0.21
S _____ 0.06
P _____ 0.56
$TiO_2$ _____ 0.40

Following reduction each charge was subjected to two stages of concentration by grinding and magnetic separation, with results as shown below:

| Second Stage Concentration 2.0 Hours Total Grinding | Charge A No Preroast, Percent | Charge B With Preroast, Percent |
| --- | --- | --- |
| Total Iron | 86.2 | 96.6 |
| Metallization | 95.7 | 98.5 |
| Calculated Gangue | 12.7 | 3.0 |
| Weight Recovery | 54.9 | 50.0 |
| Iron Recovery | 90.9 | 92.1 |

The total iron, metallization and iron recovery are much higher and the calculated gangue much lower with than without the preroast.

*Example VII*

An Aroostook manganiferous ore was prepared and then reduced as in Example I, this ore assaying as follows:

| | |
| --- | --- |
| Fe:SiO$_2$ ratio | 1.18 |
| Total Fe | 25.8 |
| SiO$_2$ | 21.8 |
| Al$_2$O$_3$ | 7.7 |
| CaO | 3.4 |
| MnO | 13.3 |
| CO$_2$ | 8.2 |

Following preroasting, reduction and concentration as in Example I, the third stage concentrate assayed as follows:

*Third stage concentrate 3.0 hours total grinding*

| | Percent |
| --- | --- |
| Total iron | 97.3 |
| Metallization | 98.5 |
| Calculated gangue | 2.3 |
| SiO$_2$ | 0.62 |
| Weight recovery | 28.8 |
| Iron recovery | 73.1 |

It will be seen that excellent total metallization and iron recoveries were obtained.

*Example VIII*

A Yawata ironsand assaying as follows was processed as described below:

| | |
| --- | --- |
| Fe:SiO$_2$ ratio | 19.4 |
| Total Fe | 56.3 |
| FeO | 29.6 |
| SiO$_2$ | 2.9 |
| Al$_2$O$_3$ | 2.5 |
| CaO | 1.2 |
| MgO | 3.2 |
| MnO | 1.0 |
| TiO$_2$ | 11.5 |
| Fe:TiO$_2$ ratio | 4.9 |

This material was roasted for two hours in the presence of 3% coke fines at 2000° F. Coke in excess of the theoretical amount required to reduce the ore was then added and reduction in the rotary kiln was affected at 2000° F. On subsequent grinding and magnetic separation in four successive stages, the fourth stage concentrate assayed as follows:

*Fourth stage concentrate 4.0 hours total grinding*

| | Percent |
| --- | --- |
| Total iron | 97.7 |
| Metallization | 99.0 |
| Calculated gangue | 2.0 |
| TiO$_2$ | 1.15 |
| Weight recovery | 71.6 |
| Iron recovery | 95.4 |

It will be seen that an extremely high iron recovery of 95.4% with a high metallization of 99.0% was obtained with retention in the concentrate of only 1.15% TiO$_2$.

*Example IX*

A New Zealand ironsand titaniferous ore assaying as follows was processed as described below:

| | |
| --- | --- |
| Fe:SiO$_2$ ratio | 87.3 |
| Total Fe | 61.1 |
| FeO | 30.6 |
| SiO$_2$ | 0.70 |
| Al$_2$O$_3$ | 2.9 |
| CaO | 0.17 |
| MgO | 2.4 |
| MnO | 0.63 |
| TiO$_2$ | 9.4 |
| Fe:TiO$_2$ ratio | 6.5 |

The material was ground 80% −150 mesh and pelletized, and the dried pellets put into a canister along with 3% coke fines and roasted for two hours at 2100° F. Carbon in excess of the theoretical amount required for reducing the ore was then added and reduction was carried out at 2100° F. for three hours. The metallized pellets were ground and concentrated, the third stage concentrate assaying as follows:

*Third stage concentrate 3.0 hours total grinding*

| | Percent |
| --- | --- |
| Total iron | 97.7 |
| Metallization | 99.0 |
| Calculated gangue | 2.0 |
| TiO$_2$ | 1.34 |
| Weight recovery | 73.8 |
| Iron recovery | 97.1 |

Here again it can be seen that extremely high iron recoveries were obtained with high metallization and with retention in the concentrate of only 1.34% TiO$_2$.

*Example X*

An ore from Greece containing about 52% total iron, 5.5% FeO, 0.12% S, and 0.85% As, with the sulfur and arsenic possibly being present as an oxidized arsenopyrite, was subjected to various roasting treatments as follows. Simple oxidative roasting of the ore at 1900° F. gave 0.10% S, but 1.2% As, due to loss of volatile constituents such as water and carbon dioxide, the loss of which on ignition was 12.35%. When this ore plus 1% coke dust was roasted for 90 minutes at 1800° F., the arsenic content was decreased to 0.24%, and after rotary kiln reduction in accordance with the process set forth in the aforesaid Moklebust patent, the arsenic content was further decreased to 0.071%. Since this was not a sufficient decrease for the intended use of the material for steel-making, a second test was made. The ore plus 2% coke dust was roasted for 90 minutes at 1800° F. and the roasted ore was found to contain 0.23% As. This roasted ore plus 1% coke dust was reroasted at 1700° F. for six hours, at which point it contained 0.007% As, an acceptable arsenic level.

These test results indicated that if the roasting were carried out in an atmosphere which was reducing to Fe$_2$O$_3$, but inert to Fe$_3$O$_4$, and for a sufficient roasting period, that this allowed stabilization of the arsenic as a lower oxide, for example as As$_2$O$_3$, and for diffusion of such volatile oxide out of the ore particles and into the gases above the bed of the reaction chamber. In order to confirm this, the following further tests were made.

*Example XI*

An ore from Japan was tested which contained about 6.3% S in the form of jarosite, potassium ferric sulfate.

When this ore was subjected to simple oxidative roasting, the following results were obtained:

| Time, Min. | Roasting Temperature, °F. | Percent Sulfur |
|---|---|---|
| 225 | 1,652 | 3.18 |
| 270 | 1,922 | 2.70 |
| 1,000 | 2,012 | 1.42 |
| 1,000 | 2,100 | 2.25 |
| 3,840 | 2,200 | 0.89 |

The ore was then roasted with additions of coke dust with results as follows:

| Time, Min. | Roasting Temperature, °F. | Percent Sulfur | Percent Coke Dust |
|---|---|---|---|
| 120 | 1,800 | >2.7 | 2 |
| 165 | 1,800 | 0.18 | 4 |
| 180 | 1,800 | 0.9 | 3 |
| 300 | 1,800 | 2.02 | 2 |

These data show the great improvement in sulfur elimination and the shorter times at lower temperatures required for eliminating the sulfur upon conducting the roasting in the presence of carbon.

It will be seen that with the 4% coke dust addition the sulfur content was reduced to 0.18% which gave a material suitable for direct reduction in a rotary kiln as in the process of the Moklebust patent.

From the test results of Examples X and XI it will be seen that control of oxidation potential upon the heating of materials such as iron ores which contain undesirable constituents, such for example as arsenic, sulfur and the like, will result in their retention or rejection depending on the level of oxygen in the atmosphere in which the roasting is carried out. Furthermore, the roasting conditions can be adjusted in this way to convert to magnetite $Fe_3O_4$, the iron oxides present in low, medium or high grade ores, and the roasted ore might thus be subjected to beneficiation prior to subjecting to direct reduction, provided recrystallization has proceeded far enough.

The basic theory of the controlled roasting treatment set forth herein as applied to the elimination of undesired contaminants, can best be explained with reference to the sulfur elimination from anhydrite, calcium sulfate, as follows. The train of reactions begins with the decomposition of the anhydrite calcium sulfate $CaSO_4$ according to the following reaction:

(7) 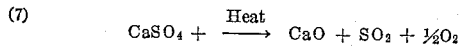
$$CaSO_4 + \xrightarrow{Heat} CaO + SO_2 + \tfrac{1}{2}O_2$$

Decreasing the oxygen partial pressure below that of air will provide driving force for the decomposition. However, there is a lower limit on the decrease, imposed by the following reaction:

(8) 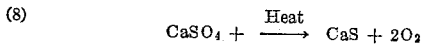
$$CaSO_4 + \xrightarrow{Heat} CaS + 2O_2$$

The following reaction (9) indicates one of the many possible ways of providing this great decrease in oxygen partial pressure:

(9) 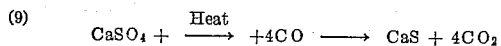
$$CaSO_4 + \xrightarrow{Heat} +4CO \longrightarrow CaS + 4CO_2$$

Under conditions sufficiently reducing to generate FeO, the calcium sulfide CaS is in the stable phase, and higher oxides will tend to be reduced. Thus a range of oxygen partial pressures exist which favors decomposition rather than reduction, i.e., CaO rather than CaS.

Similarly, such a range exists for other undesirable iron ore constituents having appreciable iron oxide vapor pressure, where the most volatile oxide is one which is intermediate between the most reduced and the most highly oxidized state. An example of this is arsenic. This metal sublimes at 615° C. The lower oxide $As_2O_3$ boils at 415° C. The higher oxide $As_2O_5$ decomposes before it either sublimes or boils in air, except when present as an arsenate, when it is relatively stable. It is in this way that the arensic was removed as set forth in Example X above. Other contaminating elements which may be thus similarly eliminated from iron ores, include: lead, antimony, bismuth, lithium, sodium, potassium, selenium, tellurium and zinc.

What is claimed is:

1. The method of reducing iron ores, concentrates and slags which contain a substantial amount of at least one member of the group consisting of iron silicates, compounds of other metals and sulfur, for recovering a high purity metallic iron concentrate, which comprises: heating such material in an oxidizing atmosphere at temperature slightly below the fusion temperature for at least one hour and thence in a mildly reducing atmosphere for at least one additional hour, thereupon adding a solid carbonaceous reductant in excess of the theoretical amount required for reducing the iron values of said material to the metallic state and reducing at temperature slightly below the fusion temperature, and thereupon concentrating the reduced material by grinding and magnetic separation, for recovery of said metallic iron concentrate.

2. The method of reducing iron ores, concentrates and slags which contain a substantial amount of at least one member of the group consisting of iron silicates, compounds of other metals and sulfur, for recovering a high purity metallic iron concentrate, which comprises: heating such material at temperature slightly below the fusion temperature for at least one hour in an oxidizing atmosphere, thence adding to said material about 0.1 to 4% by weight thereof of a solid carbonaceous reductant and continuing said heating for at least one additional hour, thereupon adding additional solid carbonaceous reductant in excess of the theoretical amount required for reducing the iron values of said material to the metallic state and reducing at temperature slightly below the fusion temperature, and thereupon concentrating the reduced material by grinding and magnetic separation, for recovery of said metallic iron concentrate.

3. The method of reducing iron ores, concentrates and slags which contain a substantial amount of at least one member of the group consisting of iron silicates, compounds of other metals and sulfur, for recovering a high purity metallic iron concentrate, which comprises: heating such material in admixture with about 0.1 to 4% by weight thereof of a solid carbonaceous reductant, at temperature slightly below the fusion temperature for a period of at least two hours, thereupon adding additional solid carbonaceous reductant in excess of the theoretical amount required for reducing the iron values of said material to the metallic state, and reducing at temperature slightly below the fusion temperature and thereupon concentrating the reduced material by grinding and magnetic separation, for recovery of said metallic iron concentrate.

4. The method of reducing iron ores, concentrates and slags which contain a substantial amount of at least one member of the group consisting of iron silicates, compounds of other metals and sulfur, for recovering a high purity metallic iron concentrate, which comprises: heating such material in admixture with about 0.1 to 4% by weight thereof of a solid carbonaceous reductant, at temperature slightly below the fusion temperature for a period of at least two hours, thereupon adding additional solid carbonaceous reductant in excess of the theoretical amount required for reducing the iron values of said material to the metallic state, and reducing at temperature slightly below the fusion temperature in a rotary kiln traversed by a counterflow of hot combustible gases controllably burned by introduction of free oxygen-containing gas introduced at spaced points along said likn, and thereupon concentrating the reduced material by grinding and magnetic separation, for recovery of said metallic iron concentrate.

5. The method of treating iron-bearing material containing ferrous and ferric silicates for converting the same to the magnetic oxide $Fe_3O_4$, which comprises: heating said material in an oxidizing atmosphere until said ferrous silicates have been converted to magnetite, and thereupon heating said material in a mildly reducing atmosphere until said ferric silicates have been converted to magnetite.

6. The method of reducing iron ore containing ferrous and ferric silicates and recovering the metallic iron values therefrom, which comprises: heating said ore in an oxidizing atmosphere until the ferrous silicates have been converted to magnetite, and thence heating in a mildly reducing atmosphere until the ferric silicates have been reduced to magnetite, thereupon reducing the so-treated ore without melting or fusion, and grinding and concentrating the reduced ore product by magnetic separation for recovering the metallic iron values.

7. The method of treating an iron silicate ore, which comprises: roasting said ore in an oxidizing atmosphere at temperature just below fusion for a period sufficient to convert ferrous iron values to magnetite, thence further roasting the same at said temperature in admixture with about 0.1 to 4% by weight thereof of a solid carbonaceous reductant, to convert ferric iron values to magnetite.

8. The method of reducing an iron silicate ore and recovering the metallic iron values, which comprises: roasting said ore in an oxidizing atmosphere at temperature just below fusion for converting ferrous iron values to magnetite, thence further roasting the same at said temperature in admixture with about 0.1 to 4% by weight thereof of a solid carbonaceous reductant for conversion of ferric iron values to magnetite, thence adding thereto to a solid carbonaceous reductant in excess of the theoretical amount required to reduce the iron values to the metallic state, and reducing at temperature just below fusion.

9. The method of treating an iron silicate ore, which comprises: roasting said ore at about 1800° F. in air for about two hours and thence further roasting the same for about two hours at said temperature in admixture with about 0.1 to 4% by weight of a solid carbonaceous reductant, until the iron values have been segregated from the silica values by recrystallization and grain growth.

10. The method of reducing iron-bearing copper slag for recovering the metallic iron values, which comprises: roasting said slag in an oxidizing atmosphere for at least two hours at temperature of about 1800° F., thence continuing said roasting of said slag in admixture with about 0.1 to 4% by weight of a solid carbonaceous reductant, said additional roasting being continued at said temperature for at least two additional hours, thence adding a solid carbonaceous reductant in excess of the theoretical amount required to reduce the iron values in said slag to the metallic state, and reducing at temperature of about 1900-2000° F. in the presence of lime, and subjecting the reduced product to grinding and magnetic separation for recovering the metallic iron values.

11. The method of treating a titaniferous ore, which comprises: heating said ore at about 1800-2100° F. in admixture with about 0.1 to 4% by weight of a solid carbonaceous reductant until the iron values have been segregated by recrystallization from the titanium values.

12. The method of treating a titaniferous ore which comprises: roasting said ore at about 1800-2100° F. in an oxidizing atmosphere for at least one hour, thence admixing therewith about 0.1 to 4% by weight of a solid carbonaceous reductant and continuing said roasting at said temperature for at least an additional hour and until the iron values have been segregated by recrystallization and grain growth from the titanium values.

13. The method of treating a manganiferous iron ore, which comprises: roasting said ore at temperature just below fusion in admixture with about 0.1 to 4% by weight thereof of a solid carbonaceous reductant until the manganese values have been segregated by recrystallization from the iron values.

14. The method of treating a manganiferous iron ore, which comprises: roasting said ore in an oxidizing atmosphere at temperature just below fusion for at least one hour, thence admixing therewith about 0.1 to 4% by weight of a solid carbonaceous reductant and continuing said roasting for at least an additional hour and until the iron values have been segregated by recrystallization and grain growth from the manganese values.

15. The method of processing a titaniferous ore for recovery of a high purity metallic iron concentrate, which comprises: finely comminuting said ore and admixing with about 0.1 to 4% by weight thereof, a finely comminuted, solid carbonaceous reductant, roasting said ore-reductant admixture slightly below the fusion temperature until the iron and titanium values have segregated by recrystallization and grain growth, thence adding to the so-treated material additional solid carbonaceous reductant in excess of the theoretical amount required for reducing the metallic iron values of said ore and reducing at temperature slightly below that of incipient fusion, and recovering and concentrating the metallic iron values from the reduced ore product by grinding and magnetic separation.

16. The method of processing a manganiferous ore for recovery of a high purity metallic iron concentrate, which comprises: finely comminuting said ore and admixing with about 0.1 to 4% by weight thereof, a finely comminuted, solid carbonaceous reductant, roasting said ore-reductant admixture slightly below the fusion temperature until the iron and manganese values have segregated by recrystallization and grain growth, thence adding to the so-treated material additional solid carbonaceous reductant in excess of the theoretical amount required for reducing the metallic iron values of said ore and reducing at temperature slightly below that of incipient fusion, and recovering and concentrating the metallic iron values from the reduced ore product by grinding and magnetic separation.

References Cited

UNITED STATES PATENTS

| | | | |
|---|---|---|---|
| 1,222,252 | 4/1917 | Wierum | 75—6 |
| 2,200,563 | 5/1940 | Simpson | 75—1 |
| 2,829,042 | 4/1958 | Moklebust | 75—1 |
| 2,885,280 | 5/1959 | Greffe | 75—1 |
| 2,944,884 | 7/1960 | Halvorson | 75—1 |
| 3,105,755 | 10/1963 | Green | 75—1 |
| 3,105,756 | 10/1963 | Green | 75—1 |
| 3,149,961 | 9/1964 | Moklebust | 75—33 |
| 3,257,198 | 6/1966 | Volk et al. | 75—1 |

BENJAMIN HENKIN, *Primary Examiner.*